(12) United States Patent
Young et al.

(10) Patent No.: US 10,509,677 B2
(45) Date of Patent: Dec. 17, 2019

(54) GRANULAR QUALITY OF SERVICE FOR COMPUTING RESOURCES

(71) Applicant: LENOVO (Singapore) PTE, LTD., New Tech Park (SG)

(72) Inventors: Bryan Loyd Young, Tualatin, OR (US); John Scott Crowe, Durham, NC (US); Jennifer Lee-Baron, Morrisville, NC (US); Nathan J. Peterson, Durham, NC (US); Amy Leigh Rose, Chapel Hill, NC (US)

(73) Assignee: LENOVA (Singapore) PTE. LTD., Singapore (SG)

( * ) Notice: Subject to any disclaimer, the term of this patent is extended or adjusted under 35 U.S.C. 154(b) by 123 days.

(21) Appl. No.: 14/871,182

(22) Filed: Sep. 30, 2015

(65) Prior Publication Data
US 2017/0090988 A1 Mar. 30, 2017

(51) Int. Cl.
*G06F 9/46* (2006.01)
*G06F 9/50* (2006.01)
(52) U.S. Cl.
CPC .......... *G06F 9/5038* (2013.01); *G06F 9/5094* (2013.01); *G06F 2209/501* (2013.01); *G06F 2209/5021* (2013.01); *Y02D 10/22* (2018.01)
(58) Field of Classification Search
CPC .......... G06F 9/50; G06F 9/5038; G06F 9/5094
See application file for complete search history.

(56) References Cited

U.S. PATENT DOCUMENTS

| 7,245,725 | B1* | 7/2007 | Beard | G06F 1/3203 380/270 |
| 9,223,709 | B1* | 12/2015 | O'Bleness | G06F 12/0864 |
| 2006/0080660 | A1* | 4/2006 | Radhakrishnan | G06F 9/5044 718/100 |
| 2007/0220530 | A1* | 9/2007 | Hsieh | G06F 1/3203 719/327 |
| 2008/0235684 | A1* | 9/2008 | Anand | G06F 9/5033 718/100 |
| 2009/0067372 | A1* | 3/2009 | Shah | H04L 47/10 370/328 |
| 2009/0138682 | A1 | 5/2009 | Capps, Jr. et al. | |

(Continued)

FOREIGN PATENT DOCUMENTS

CN 101366004 A 2/2009
CN 102483703 A 5/2012

*Primary Examiner* — James J Lee
(74) *Attorney, Agent, or Firm* — Kunzler Bean & Adamson

(57) ABSTRACT

For providing granular quality of service (QoS) for computing resources in a computing system, systems, apparatus, and methods are disclosed. The apparatus includes a processor having a plurality of processor cores and a memory that stores code executable by the processor to identify a thread belonging to a computing process, to identify one or more thread-level tags associated with the thread, to determine a computational requirement of the thread based on the one or more thread-level tags, and to assign the thread to one of the processor cores based on the computational requirement. In certain embodiments, the may include code executable by the processor to allocate hardware resources to the thread based on an intra-process priority, the hardware resources being allocated from a set of hardware resources assigned to the computing process.

20 Claims, 6 Drawing Sheets

(56) References Cited

U.S. PATENT DOCUMENTS

| | | | | |
|---|---|---|---|---|
| 2009/0293061 A1* | 11/2009 | Schwinn | ............... | G06F 9/3851 |
| | | | | 718/103 |
| 2010/0138675 A1* | 6/2010 | Nikazm | .................... | G06F 1/26 |
| | | | | 713/300 |
| 2011/0078412 A1* | 3/2011 | Emma | .................... | G06F 9/3836 |
| | | | | 712/30 |
| 2014/0214868 A1* | 7/2014 | Ladak | ............... | G06F 17/30557 |
| | | | | 707/756 |
| 2014/0298349 A1* | 10/2014 | Jackson | ................. | G06Q 50/06 |
| | | | | 718/104 |
| 2015/0271531 A1* | 9/2015 | Wen | ........................ | H04N 19/52 |
| | | | | 375/240.16 |
| 2016/0210174 A1* | 7/2016 | Hsieh | .................... | G06F 9/5038 |

* cited by examiner

GRANULAR QUALITY OF SERVICE FOR COMPUTING RESOURCES

FIELD

The subject matter disclosed herein relates to quality of service (QoS) for computing resources and more particularly relates to providing granular QoS for computing resources in a computing system.

BACKGROUND

Description of the Related Art

Today's computers execute threads at full speed, without regard to its needs. It does this because programs have no way of telling the system what resources it needs or what to expect in terms of resource demands. Despite the many advanced scheduler algorithms, there is still no way to give one thread priority over another thread under the same application. There is no true way to isolate a single thread on a single core within an application. Frequent CPU state changes wastes power and adds latency.

BRIEF SUMMARY

An apparatus for providing granular QoS for computing resources in a computing system is disclosed. A method and computer program product also perform the functions of the apparatus. The apparatus includes a processor having a plurality of processor cores and a memory that stores code executable by the processor. The memory includes code executable by the processor to identify a thread belonging to a computing process. The memory includes code executable by the processor to identify one or more thread-level tags associated with the thread. The memory includes code executable by the processor to determine a computational requirement of the thread based on the one or more thread-level tags. The memory includes code executable by the processor to also assign the thread to one of the processor cores based on the computational requirement.

In certain embodiments, the memory includes code executable by the processor to determine an intra-process priority of the thread based on the one or more thread-level tags. The memory may also include code executable by the processor to allocate hardware resources to the thread based on the intra-process priority, wherein the hardware resources are allocated from a set of hardware resources assigned to the computing process. In some embodiments, the memory includes code executable by the processor to identify thread dependencies among a plurality of threads belonging to the computing process, wherein determining the intra-process priority of the thread includes assigning the intra-process priority based on the thread dependencies. In further embodiments, the memory may include code executable by the processor to determine an extra-process priority of the computing process based on one or more process-level tags, wherein the set of hardware resources assigned to the computing process is based on the extra-process priority.

In some embodiments, the plurality of processor cores include a first set of processor cores operating at a first processor speed and a second set of processor cores operating at a second processor speed, the second processor speed being less than the first processor speed. The memory may include code executable by the processor to determine a speed requirement of the thread based on the one or more thread-level tags and determine a thread completion time based on the second processor speed. In some embodiments, assigning the thread to one of the processor cores based on the computational requirement includes assigning the thread to a processor core of the second set of processor cores in response to the thread completion time being less than the speed requirement.

In certain embodiments, the memory includes code executable by the processor to identify a power state of the apparatus, wherein assigning the thread to one of the processor cores is further based on the power state. In some embodiments, assigning the thread to one of the processor cores based on the power state includes assigning the thread to a processor core with a lower processor speed in response to the power state being on battery power and assigning the thread to a processor core with a higher processor speed in response to the power state being on external power. In certain embodiments, identifying at least one thread belonging to a computing process includes identifying a main worker thread, and wherein assigning the main worker thread to one of the processor cores includes assigning the main worker thread to a processor core reserved for the main worker thread.

In some embodiments, the memory includes code executable by the processor to determine a time requirement of the computing process based on one or more process-level tags. The memory may also include code executable by the processor to determine a cost of executing the computing process locally. The memory may further include code executable by the processor to offload the computing process to a remote computing device based on the time requirement and the cost of executing the computing process locally.

The method includes identifying, by use of a processor, at least one thread belonging to a computing process, identifying one or more tag associated with the thread, determining a computational requirement of the thread based on the one or more tags, and assigning the thread to one of the processor cores based on the computational requirement. The method may further include identifying system properties of a computer system executing the computing process, wherein assigning the thread to one of the processor cores is further based on the system properties.

In some embodiments, identifying at least one thread belonging to a computing process includes identifying a plurality of threads. The method may include determining an intra-process priority for each thread based on the one or more tags. The method may also include identifying a set of hardware resources assigned to the computing process. The method may further include allocating hardware resources, from the set of hardware resources, to each thread based on the intra-process priority. In certain embodiments, identifying at least one thread belonging to a computing process includes identifying a main worker thread, and assigning the main worker thread to one of the processor cores includes isolating the main worker thread to its own processor core.

In some embodiments, the determining a computational requirement of the thread based on the one or more tags includes determining a time-sensitivity level of the thread based on the one or more tags and assigning an intra-process priority to the thread based on the time-sensitivity level. In certain embodiments, determining a computational requirement of the thread based on the one or more tags includes identifying a memory cache requirement of the thread, wherein assigning the thread to one of the processor cores based on the computational requirement includes selecting a processor core based on the memory cache requirement. In further embodiments, assigning the thread to one of the processor cores based on the computational requirement further includes disabling hyper-threading on the selected processor core based on the memory cache requirement.

In some embodiments, determining a computational requirement of the thread based on the one or more tags comprises identifying a speed requirement of the thread. In further embodiments, assigning the thread to one of the processor cores based on the computational requirement comprises selecting a processor core based on the speed requirement.

The computer program product includes a computer readable storage medium that stores code executable by a processor, the executable code comprising code to perform: identifying at least one thread belonging to a computing process, identifying one or more tag associated with the thread, determining a computational requirement of the thread based on the one or more tags, and assigning the thread to one of the processor cores based on the computational requirement.

In certain embodiments, the code further performs: allocating hardware resources to the thread based on the one or more tags, wherein the hardware resources are allocated from a set of resources assigned to the computing process. In some embodiments, the code further performs: identifying an untagged thread, wherein the untagged thread is not associated with any tags, comparing the untagged thread to one or more thread profiles, and associating one or more tags with the untagged thread based on the comparison.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
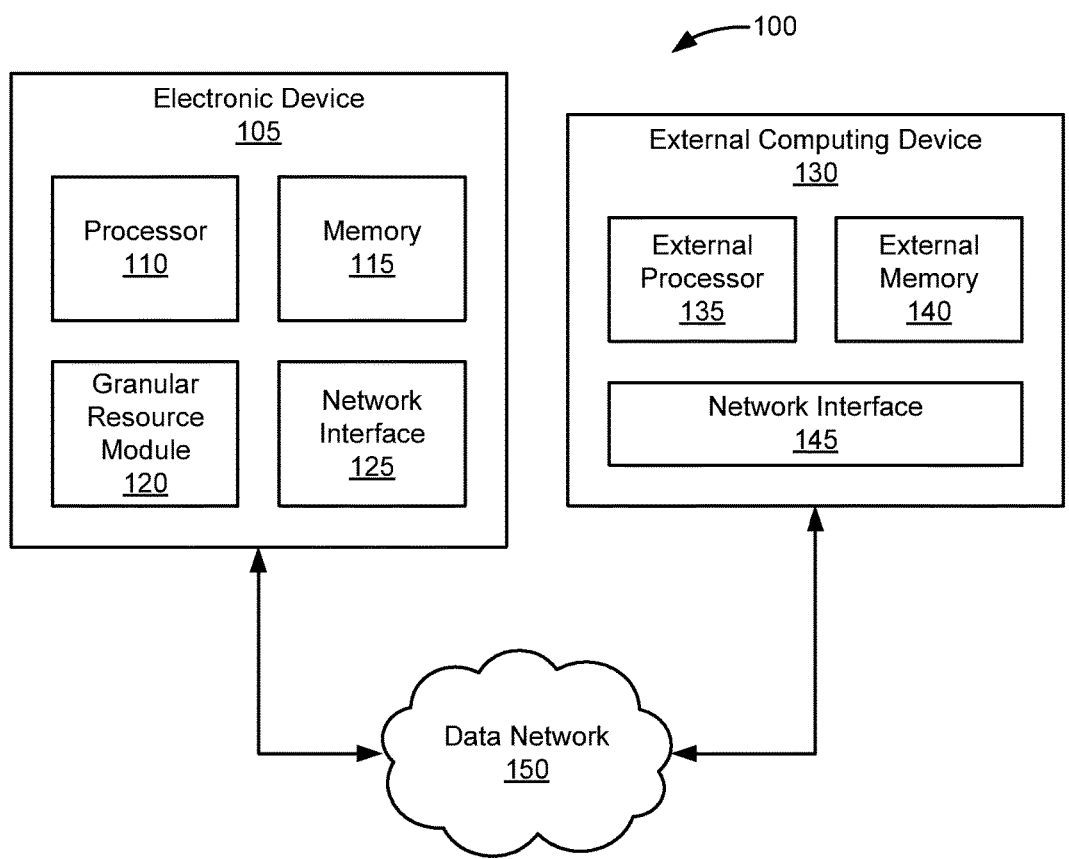
FIG. 1 is a schematic block diagram illustrating one embodiment of a system for providing granular QoS for computing resources in a computing system.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatus, methods, and program products provide for more granular QoS for computing resources in a computing system as compared to conventional scheduling. Threads are tagged with identity and detail so as to improve resource allocation. While most applications are multi-threaded, however in the case of games and parametric modeling for example, there is always a main worker thread that is significantly more demanding than the others. To optimize the application the primary worker thread is isolated on a single core with no other threads scheduled to interfere with it. Other threads may be distributed freely across the remaining cores. From here, setting an extra-process priority of an application lets the scheduler know how to balance the application against other applications, while the individual threads of a computing process are managed differently based on their needs not under the applications umbrella.

Today's CPU powers up and down reactively to changes in system demand. This process is reactionary and does not take into account what workloads may be coming or when current workloads may end. Reactionary CPUs move computing processes around to rebalance and optimize resources; however this process is expensive and consumes what could be unnecessary resources as it redistributes computing processes. By knowing the computational requirements, importance and sensitivity of a new thread, the scheduler can place the thread on the right core the first time. This could include a mix of lower power cores that operate at a slow and steady pace, but is sufficient for many threads that are not compute intensive or time sensitive. By assigning and balancing resources correctly up front, the frequent CPU power state changes necessary to lower overall power consumption or react to demand is greatly reduced. Overhead from redistribution of threads is substantially reduced. This efficiency reduces the average CPU power consumption (and thereby the total power consumption).

Current CPUs have a fixed L2/L3 cache size across all cores. When a CPU processes requests on behalf of a thread it moves resources between L1, L2, and L3 cache as needed. The CPU requests data first from the cache in order. Each request that must propagate to the next level is known as a cache miss. Each successive level of cache is significantly slower than the one above it, with main memory being the slowest operation. Therefore it is highly beneficial to complete an operation in the cache closest to the CPU when possible.

Hyper-threading further limits the L2 cache by splitting it between two logical cores, which doubles the number of available cores but also increases the chances of cache misses. In most computing scenarios the benefit of the additional cores outweighs the cost of the lost cache. Knowing the type of workload a thread brings then enables a varying selection of cores, some with hyper-threading, some without, allowing the thread to be allocated to the most suitable core for the workload. The end result is faster, more efficient processing with lower overhead. The power savings in this scenario extends to the reduced demand on the main memory.

Knowing the full make up of an applications workload could allow a determination of whether to process the work locally or push it out to an external computing device (e.g., to a compute farm). This determination is much more efficient with network resources as well as where the workload is sent. It could also determine which network resources is most efficient or sufficient to redirect the workload. This is particularly useful in mobile environments where laptops connected to power may have sufficient resources to complete the work most efficiently locally, but not on battery power.

FIG. 1 depicts a system 100 for providing granular QoS for computing resources in a computing system. The system 100 may include an electronic device 105, itself including a processor 110, a memory 115, a granular resource module 120, and a network interface 125. In some embodiments, the electronic device 105 may be connected to another device, such a remote computing device 130, via a data network 150. The data network 150 may be the Internet, a local area network, a wide-area network, a Wi-Fi network, a mobile telephone network, or combinations thereof.

The electronic device 105 may be any digital device capable of executing computing processes using a microprocessor, microcontroller, or other processing device, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a desktop computer, a gaming console, or the like. In other embodiments, the electronic device 105 may be an embedded computer, such as a system-on-a-chip (SoC), an application specified standard processor (ASSP), an application-specific instruction set processor (ASIP), or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In some embodiments, the processor 110 executes instructions stored in the memory 115 to perform the methods and routines described herein. The processor 110 is communicatively coupled to the memory 115, the granular resource module 120, and the network interface 125.

In some embodiments, the processor 110 may include a plurality of processing units, such as a plurality processing cores, a plurality of CPUs, a plurality of microcontrollers, or the like. In certain embodiments, the plurality of processing units may have different system properties. For example, the processor 110 may comprise a first CPU with a processor speed of 2.4 GHz and having eight processor cores. The processor 110 may also comprise a second CPU with a processor speed of 4.2 GHz and having to call processor cores. In a further example, the first CPU and the second CPU may have different amounts of memory cache.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores data relating to providing granular QoS for computing resources in a computing system, for example, the memory 115 may store thread-level tags, process-level tags, thread profiles, and the like. In some embodiments, the memory 115 also stores program code and related data, such as an operating system or other controller algorithms operating on the electronic device 105.

The granular resource module 120, in one embodiment, is configured to identify a thread belonging to a computing process, identify one or more thread-level tags associated with the thread, determine a computational requirement of the thread based on the one or more thread-level tags, and assign the thread to one of the processor cores based on the computational requirement. The granular resource module 120 may determine an intra-process priority of the thread based on the one or more thread-level tags. The granular resource module 120 may also allocate hardware resources to the thread based on the intra-process priority, wherein the hardware resources are allocated from a set of hardware resources assigned to the computing process.

In some embodiments, the granular resource module 120 may identify system properties of a computer system executing the computing process, wherein assigning the thread to one of the processor cores is further based on the system properties. In one embodiments, the granular resource module 120 may identify an untagged thread, wherein the untagged thread is not associated with any tags, compare the untagged thread to one or more thread profiles, and associate one or more tags with the untagged thread based on the comparison.

In some embodiments, the x105 may also include an input device and/or an output device. In certain embodiments, the input device may comprise may include any known computer input device including a touch panel, a button, a keyboard, a stylus, a microphone, or the like. In some embodiments, the input device may be integrated with the output device, for example, as a touchscreen or similar touch-sensitive display. In some embodiments, the input device includes a touchscreen such that text may be input using a virtual keyboard displayed on the touchscreen and/or by handwriting on the touchscreen. In some embodiments, the input device includes two or more different devices, such as a keyboard and a touch panel.

In certain embodiments, the output device may include an electronically controllable display or display device. The output device may be designed to output visual, audible, and/or haptic signals. In some embodiments, the output device includes an electronic display capable of outputting visual data to a user. For example, the output device may include, but is not limited to, an LCD display, an LED display, an OLED display, a projector, or similar display device capable of outputting images, text, or the like to a user. As another, non-limiting, example, the output device may include a wearable display such as a smart watch, smart glasses, a heads-up display, or the like. Further, the output device may be a component of a smart phone, a personal digital assistant, a television, a table computer, a notebook (laptop) computer, a personal computer, a vehicle dashboard, or the like.

In certain embodiments, the output device includes one or more speakers for producing sound. For example, the output device may produce an audible alert or notification (e.g., a beep or chime). In some embodiments, the output device includes one or more haptic devices for producing vibrations, motion, or other haptic feedback. In some embodiments, all or portions of the output device may be integrated with the input device 306. For example, the input device and output device may form a touchscreen or similar touch-sensitive display. In other embodiments, the output device may be located near the input device.

In certain embodiments, the electronic device 105 may include a network interface 125. The network interface 125, in one embodiment, comprises software and/or hardware connecting the electronic device 105 to the remote computing device 130, either directly or via the data network 150. For example, the network interface 125 may include a physical network adapter and one or more protocol stacks for sending queries to and receiving responses and/or data from the remote computing device 130 using computer networking protocols. In one embodiment, the network interface 125 may include a wireless networking interface that connects the electronic device 105 to the remote computing device 130 over radio or other wireless communication mediums. In another embodiment, the network interface 125 may include a wired or fiber optic interface for connecting the electronic device 105 to the remote computing device 130. In some embodiments, the network interface 125 is configured to establish secure connections with the remote computing device 130 over the data network 150.

The remote computing device 130, in one embodiment, is configured to execute one or more computing processes on behalf of the electronic device 105. For example, the electronic device 105 may offload one or more computing processes to the remote computing device 130, wherein the remote computing device 130 executes the offloaded computing processes and returns their results to the electronic device 105. In certain embodiments, the remote computing device 130 may be a server. In further embodiments, the remote computing device 130 may be part of a server farm, or cluster.

As depicted, the remote computing device 130 may include at least one remote processor 135, a remote memory 140, and a network interface 145. The remote processor 135, in one embodiment, may comprise any known controller capable of executing computer-readable instructions and/or capable of performing logical operations. For example, the remote processor 135 may be a microcontroller, a microprocessor, a central processing unit (CPU), a graphics processing unit (GPU), an auxiliary processing unit, a FPGA, or similar programmable controller. In some embodiments, the remote processor 135 executes instructions stored in the remote memory 140 to perform the methods and routines described herein. The remote processor 135 is communicatively coupled to the remote memory 140, and the network interface 145.

The remote memory 140, in one embodiment, is a computer readable storage medium. In some embodiments, the remote memory 140 includes volatile computer storage media. For example, the remote memory 140 may include a random access memory (RAM), including dynamic RAM (DRAM), synchronous dynamic RAM (SDRAM), and/or static RAM (SRAM). In some embodiments, the remote memory 140 includes non-volatile computer storage media. For example, the remote memory 140 may include a hard disk drive, a flash memory, or any other suitable non-volatile computer storage device. In some embodiments, the remote memory 140 includes both volatile and non-volatile computer storage media.

In some embodiments, the remote memory 140 stores data relating to providing granular QoS for computing resources in a computing system, for example, the remote memory 140 may store thread profiles, and the like. In some embodiments, the remote memory 140 also stores program code and related data, such as an operating system or other controller algorithms operating on the remote computing device 130.

The network interface 145, in one embodiment, comprises software and/or hardware connecting the remote computing device 130 to the electronic device 105, either directly or via the data network 150. For example, the network interface 145 may include a physical network adapter and one or more protocol stacks for receiving queries from and or sending responses and/or data from the electronic device 105 using computer networking protocols. In one embodiment, the network interface 145 may include a wireless networking interface that connects the remote computing device 130 to the electronic device 105 over radio or other wireless communication mediums. In another embodiment, the network interface 145 may include a wired or fiber optic interface for connecting the remote computing device 130 to the electronic device 105. In some embodiments, the network interface 145 is configured to establish secure connections with the electronic device 105 over the data network 150.

In certain embodiments, the remote computer device 130 may also include a granular resource module (not shown). The granular resource module may be substantially similar to the granular resource module 120, described above. Additionally, in some embodiments the remote computing device 130 may include an input device and/or an output device substantially similar to those described above with reference to the electronic device 105.

Figure 2:
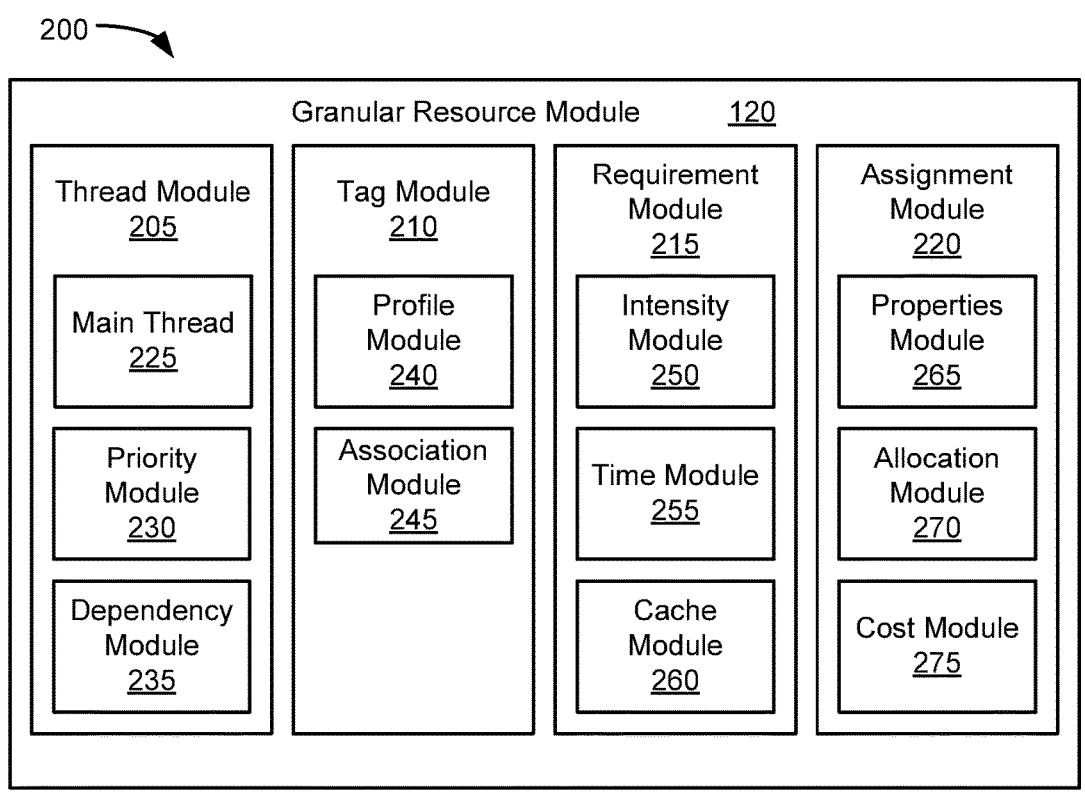
FIG. 2 is a schematic block diagram illustrating one embodiment of an apparatus for providing granular QoS for computing resources in a computing system.

FIG. 2 depicts a granular QoS apparatus 200 for providing granular QoS for computing resources in a computing system. The granular QoS apparatus 200 may include a granular resource module 120 and may be connectively coupled to the input device 125 that receives input stroke data. As depicted, the granular resource module 120 includes a thread module 205, a tag module 210, a requirement module 215, and an assignment module 220. In some embodiments, the granular QoS apparatus 200 may also include one or more of: a main thread module 225, a priority module 230, a dependency module 235, an intensity module 240, a time module 245, a cache module 250, a profile module 255, an association module 260, a properties module 265, an allocation module 270, and a cost module 280. The modules 205-280 may be connectively coupled to one another. In certain embodiments, each of the modules 205-280 may be implemented in a hardware circuit, as described above. In other embodiments, one or more of the modules 205-280 may be implemented as firmware and/or software, such as program code embedded on computer readable media, as described above.

The thread module 205, in one embodiment, is configured to identify thread belonging to the computing process. The computing process, in certain embodiments, may be a software application executing on the electronic device 105. In some embodiments, the computing process may be a single-threaded computing process containing a single worker thread. In other embodiments, the computing process may be a multi-threaded computing process containing a plurality of worker threads. In certain embodiments, the multi-threaded computing process may include a main worker thread and one or more secondary worker threads.

In some embodiments, the thread module 205 may determine whether a thread is a main worker thread or a secondary worker thread, may determine an intra-process priority of a thread, and/or may determine thread dependencies of threads of the computing process. In certain embodiments, the tag module 210 may include one or more submodules, such as the main thread module 225, the priority module 230, and/or the dependency module 235 for performing the above functions.

The main thread module 225, in one embodiment, is configured to identify a main worker thread for the computing process. For example, the main thread module 255 may determine whether a thread is the main worker thread. In one embodiment, the main worker thread performs the bulk of the computing process. In another embodiment, the main worker thread may be a user interface thread for interacting with the user. In a further embodiment, the main worker thread may coordinate the secondary worker threads.

In certain embodiments, the main worker thread is associated with a main worker tag, wherein the main thread module 255 identifies the main worker thread using the main worker tag. In another embodiment, the main thread module 255 may use a runtime analysis of the computing process to determine whether a thread is a main worker thread. The main thread module 255 may be further configured to determine whether a thread is a secondary worker thread. In response to identifying the main worker thread, the main worker module 225 may provide an indication to the assignment module, wherein the assignment module 225 assigns the main worker thread to its own processor core (e.g., to a processor core not assigned to a secondary worker thread of the computing process).

The priority module 230, in one embodiment, is configured to determine an intra-process priority of the thread based on one or more thread-level tags. As used herein, the intra-process priority of a thread refers to the thread's importance (priority) with respect to other threads of the same computing process. For example, a thread of the computing process that handles user interactions may have a higher intra-process priority than a thread of the same computing process that retrieves data from non-volatile memory 115. The intra-process priority indicates the order in which computing resources should be allocated within the computing process.

In certain embodiments, the priority module 230 may be further configured to determine an extra-process priority of the computing process based on one or more process-level tags. As used herein, the extra-process priority of a thread refers to the computing process' importance (priority) with respect to other computing processes executing on the electronic device 105. The priority module 230 may indicate the extra-process priority to a CPU schedule, or similar scheduling algorithm, wherein a set of hardware resources is allocated to the computing process based on the extra-process priority.

In some embodiments, the priority module 230 may receive an indication of a time-sensitivity level of a particular thread, wherein the priority module 230 assigns an intra-process priority to the thread based on the time-sensitivity level. For example, the tags may indicate a thread's tolerance to delay (time-sensitivity level, wherein the priority module 230 may assign a lower intra-process priority to the thread in response to the thread having a higher tolerance to delay. Conversely, the priority module 230 may assign a higher intra-process priority to a thread in response to the thread having a lower tolerance to delay.

The dependency module 235, in one embodiment, is configured to identify thread dependencies among the plurality of threads belonging to the computing process. In certain embodiments, the dependency module 235 may indicate the thread dependencies to the priority module 230, wherein the priority module 230 determines the intra-process priority of a thread based on the thread dependencies. For example, the priority module 230 may assign an intra-process priority based on thread dependencies identified by the dependency module 235.

In some embodiments, dependency module 235 may identify thread dependencies using tags. For example, a programmer may add a thread-level tag indicating that a first thread is dependent on a second thread. In other embodiments, the dependency module 235 may determine thread dependencies by analyzing the runtime behavior of the threads of the computing process. For example, the dependency module 235 may identify when a first thread waits for a second thread to perform a task before continuing execution. The dependency module 235 may further identify a third thread that also waits on the second thread completing its task before executing, wherein the first thread also waits for the third thread to complete its task before continuing execution. Here, the runtime behavior may indicate that the first thread is dependent on the second thread and on the third thread, and that the third thread is also dependent on the second thread.

The tag module 210, in one embodiment, is configured to identify one or more tags associated with the thread. In some embodiments, a particular thread may be associated with one or more thread-level tags and one or more process-level tags. As used herein, a thread-level tag refers to a piece of information describing characteristics of a thread. In some embodiments, a thread-level tag may identify a thread, indicate a priority of the thread, indicate a computational requirement/preference for thread, indicate a relationship to another thread of the same computing process, or the like. As used herein, a process-level tag refers to a piece of information describing characteristics of a computing process. Each thread of a computing process is associated with the same process-level tags (e.g., the threads inherit the process-level tags of the computing process). In some embodiments, a process-level tag may identify a computing process, may indicate a priority of the computing process, may indicate a computational requirement/preference for the computing process, or the like.

In some embodiments, the tag module 210 may identify a tag provided by an author of the computing process. For example, a programmer creating the computing process may provide one or more tags indicating characteristics and/or computational requirements of the threads of the computing process. In one embodiment, the author may provide one or more thread-level tags. In another embodiment, the programmer may provide one or more process-level tags. In other embodiments, the tag module 210 may identify a tag automatically generated based on an analysis (e.g., a runtime analysis) of the computing process. For example, the association module 245 may automatically associate one or more thread-level tags and/or one or more process-level tags with a thread based on a runtime analysis of the computing process.

In some embodiments, the tag module 210 may identify an untagged thread, wherein the untagged thread is not associated with any tags. In further embodiments, the tag module 210 may associate one or more tags with an otherwise untagged thread of the computing process. For example, the tag module 210 may compare an untagged thread to thread profile and associate one or more thread-level tags with the untagged thread, based on a matching thread profile. In certain embodiments, the tag module 210 may include one or more submodules, such as the profile module 240 and/or the association module 245 for associating one or more tags with an otherwise untagged thread of the computing process.

The profile module 240, in one embodiment, is configured to compare a thread to one or more thread profiles. For example, the profile module 240 may compare an untagged thread to one or more thread profiles, wherein the association module 245 associated a tag with the untagged thread based on the comparison. In another example, the profile module 240 may compare a dynamically generated thread profile with one or more stored thread profiles, the thread profile being dynamically generated for the thread based on a runtime analysis in memory, wherein the association module 245 associated a tag with the untagged thread based on the comparison.

In some embodiments, the one or more threads profiles may be stored in memory 115. In other embodiments, the one or more thread profiles may be stored in an external memory, such as the remote memory 140 of the remote computing device 130. The profile module 240 may control the network interface 125 to query the remote computing device 130 for thread profiles matching the untagged thread. The remote computing device 130 may return one or more thread-level tags in response to the query.

In certain embodiments, the profile module 240 may build a profile for the untagged thread. In one embodiment, the profile is based on characteristics of the untagged thread including, but not limited to, length, calls, comments, and the like. In some embodiments, the profile module 240 may monitor utilization of the processor 110 while the untagged thread(s) run in order to identify characteristics such as, wait times (e.g., how long the thread waits for another thread to complete a task), wait counts (e.g., how many times the thread waits for another thread to complete a task), input/output (I/O) operations, amount of CPU time used, an amount of time to complete (including both execution time and wait time), an amount of cache memory used, a number of cache misses (and/or hits), and the like. Based on collected data indicating the thread characteristics, the profile module 240 forms a profile for the thread.

In response to creating a profile for the untagged thread, the profile module 240 may then compare the profile built for the untagged thread to the one or more thread profiles stored in memory (e.g., local memory 115 and/or remote memory 140). In certain embodiments, the one or more thread profiles may be associated with one or more thread-level tags, wherein the profile module 240 identifies the one or more thread-level tags corresponding to thread profiles matching the profile built for the untagged thread. The profile module 240 may indicate the corresponding thread-level tags creation module 245, wherein the association module 245 associates the one or more thread-level tags corresponding to matching thread profiles with the untagged thread.

The association module 245, in one embodiment, is configured to associate one or more tags with an untagged thread. In certain embodiments, the association module 245 receives one or more matching tags from the profile module 240, wherein the association module 245 associates the matching tags to the untagged thread. The matching tags may be based on a comparison of the untagged thread to one or more thread profiles. In some embodiments, the association module 245 may create a file associating the untagged thread the one or more tags. In other embodiments, the association module 245 may edit metadata associated with the untagged thread so as to associate the untagged thread with the one or more tags in the metadata.

The requirement module 215, in one embodiment, is configured to determine a computational requirement of the thread based on the one or more tags. For example, the requirement module 215 may determine the computational requirement based on at least one thread-level tag identified by the tag module 210. The computational requirements, in one embodiment, reflect a quality-of-service (QoS) level of the thread. For example, the requirement module 215 may determine a computational requirement of the thread based on a thread-level QoS tag.

In some embodiments, the requirement module 215 may determine a particular type of computational requirement based on the tags. In some embodiments, the computational requirements identified by the requirement module 215 include, but is not limited to, a computational intensity of the thread, a time-sensitivity of the thread, and a cache/memory requirement of the thread. In certain embodiments, the requirement module 215 may include one or more submodules, such as the intensity module 250, the time module 255, and/or the cache module 260 for identifying the computational requirements of the thread.

The intensity module 250, in one embodiment, is configured to determine a computational intensity of the thread based on the thread-level tags. As used herein, the computational intensity of a thread refers to an amount of processing power required to execute thread. In some embodiments, the computational intensity may be measured in CPU cycles. In other embodiments, the computational intensity may be estimated by a number and/or a type of calculations required by the thread. In some embodiments, the computational intensity may indicate a speed requirement of the thread. Thus, in certain embodiments, the intensity module 250 may determine a speed requirement of the thread based on one or more thread level tags. The speed requirement and/or computational intensity may be relative to other threads of the computing process and/or relative to other computing processes executing on the electronic device 105.

For example, the main worker thread may depend on a secondary worker thread to complete a particular task before the main worker can continue its execution. In some embodiments, the thread dependency may be indicated by one or more tags, such as a tag indicating that the main worker thread must wait for the secondary worker thread. The intensity module 250 may thus determine that the secondary worker thread has a high speed requirement based on one or more tags. The assignment module 220 may assign the secondary worker thread to a fast processor core based on the high speed requirement, in order to minimize an amount of time the main worker thread waits for the secondary worker thread.

In another embodiment, the intensity module 250 may identify a percentage of the computing process' resources (e.g., CPU cycles) required by a particular thread. For example, many computing processes have a main worker thread requiring a greater portion of resources and one or more auxiliary/secondary worker threads requiring a lesser portion of resources. In some embodiments, the computational intensity may indicate a portion of resources required by a thread. Thus, in certain embodiments, the assignment module 220 may assign a thread requiring a greater amount of resources to a processor core having greater resources (e.g., greater processor speed and/or greater L2/L3 cache) and assign a thread requiring a lesser amount of resources to a processor core having fewer resources (e.g., to a core with lesser speed/cache or to a core where more thread are sharing the core).

The time module 255, in one embodiment, is configured to determine a time-sensitivity level of the thread based on the tags. In some embodiments, the time-sensitivity level may relate to a thread's tolerance of delay. The time-sensitivity level may be based on a thread-level QoS value associated with the thread. For example, a thread with a lower QoS level may be more delay-tolerant than another thread with a higher QoS level. In some embodiments, the time-sensitivity may be an intra-process time-sensitivity (e.g., a time-sensitivity relative to other threads in the computing process). In other embodiments, the time-sensitivity level may be an extra-process time-sensitivity (e.g., a time-sensitivity relative to other computing processes, applications, or tasks running on the electronic device 105). In certain embodiments, the time module 255 may indicate the time-sensitivity level to the assignment module 220, wherein the assignment module 220 may assign the thread to a processor core based on the time requirement.

In another embodiment, the time module 255 may be further configured to determine a time requirement of the computing process based on one or more process-level tags. The time requirement, in one embodiment, may be an amount of time in which the computing process and/or thread is expected to complete. In some embodiments, the time-sensitivity may be an intra-process time-sensitivity (e.g., a time-sensitivity relative to other threads in the computing process). In other embodiments, the time-sensitivity level may be an extra-process time-sensitivity (e.g., a time-sensitivity relative to other computing processes, applications, or tasks running on the electronic device 105). In certain embodiments, the time module 255 may indicate the time requirement to the assignment module 220, wherein the assignment module 220 may assign the thread to a processor core based on the time requirement. In further embodiments, the assignment module 220 may determine whether to offload the thread to a remote computing device 130 based on the time requirement.

The cache module 260, in one embodiment, is configured to identify memory cache requirement of the thread. The memory cache requirement may indicate a preferred amount of memory cache (also referred to as a CPU cache) for a thread. Each processor core in the electronic device 105 includes a memory cache (also referred to as a CPU cache). When the processor core requires a data value, it checks for a copy of the data value in the memory cache before checking in the memory 110 (e.g., in main memory (RAM) or non-volatile memory). In some embodiments, a processor core may include multiple levels of memory cache, such as L1, L2, L3, etc., organized hierarchically so that the processor core checks in each level of the hierarchy for a required data value before checking the main memory (e.g., memory 110).

In some embodiments, a thread-level tag may indicate that a thread is cache intensive, wherein the cache module 260 may identify a high memory cache requirement based on the tag and the assignment module 220 may assign the thread to a processor core with a higher level of memory cache. Alternatively, the assignment module 220 may assign the thread to a processor core with hyper-threading disabled. In hyper-threading, a physical processor core comprises two logical processors that can each operate independently from the other and that share the memory cache of the processor core. Thus, when hyper-threading is disabled a greater amount of memory cache is available to the cache intensive thread.

In some embodiments, the requirement module 215 may indicate the computational requirement(s) to the assignment module 220, wherein the assignment module 220 assigns the thread to a processor core based on the computational requirement. For example, the requirement module 215 may indicate a speed requirement, time requirement, time-sensitivity level, and/or a memory cache requirement to the assignment module 220, wherein the assignment module assigns the thread to a processor core based on the received information.

The assignment module 220, in one embodiment, is configured to assign the thread to one of the processor cores based on the computational requirement. For example, the assignment module 220 may receive an indication of one or more computational requirements of a particular thread of the computing process, wherein the assignment module 220 assigns the particular thread to a processor core based on the received computational requirements. In some embodiments, the assignment module 220 may assign a main worker thread to one of the processor cores reserved for the main worker thread (e.g., isolating the main worker thread to its own processor core).

In certain embodiments, the assignment module 220 may assign the thread further based on the power state of a computing system (e.g., the electronic device 105) executing the thread. For example, the assignment module 220 may assign the thread to a processor core with a lower processor speed in response to the power state being on battery power and assigning the thread to a processor core with a higher processor speed in response to the power state being on external power.

In some embodiments, the assignment module 220 assigns the thread to a processor core based on a speed requirement of the thread. For example, consider a computing system having a first set of processor cores operating at a first speed and a second set of processor core operating at a second, slower speed. If a particular thread has a speed requirement above a threshold (alternatively, if the thread has a target completion time below a threshold), then the assignment module 220 may assign the thread to a processor core of the first (faster) set of processor cores, otherwise the assignment module 220 may assign the thread to a processor core of the second (slower) set of processor cores (e.g., in response to the thread completion time being less than the speed requirement).

In certain embodiments, the assignment module 220 may assign a threaded to a processor core based on a time requirement. For example, the time module 255 may indicate the time requirement to the assignment module 220, wherein the assignment module 220 may assign the thread to a processor core based on the time requirement. In further embodiments, the assignment module 220 may determine whether to offload the thread to a remote computing device 130 based on the time requirement. For example, if the thread is not time sensitive (e.g., having a large time requirement), then the assignment module 220 may offload the thread to a remote computing device 130, provided that the cost of offloading thread (e.g., local CPU cost, local power consumption cost, etc.) is less than the cost of locally processing the thread.

In some embodiments, the assignment module 220 may determine a thread completion time based on a processor speed and an estimated length of the thread. For example, a thread-level tag may indicate that a thread may take approximately eighteen thousand (18,000) processor cycles to complete. The assignment module 220 may determine a thread completion time by multiplying the estimated length (18,000 processor cycles) by the processor speed. The assignment module 220 may then compare the thread completion time to a time requirement and/or speed requirement of the thread (as indicated by one or more thread-level tags). The assignment module may then assign the thread to a slowest processor core (e.g., having the lowest processor speed) that can complete the thread (e.g., based on the estimated length of the thread) while still meeting the time requirement and/or the speed requirement.

In some embodiments, the assignment module 220 assigns a thread to a processor core based on a memory cache requirement. For example, the x215 may identify a memory cache requirement of a particular thread, wherein the assignment module 220 selects a processor core based on a memory cache requirement. In certain embodiments, the memory cache requirement may exceed a predefined threshold, wherein the assignment module 220 may assign the thread to a processor core having hyper-threading disabled. Alternatively, the assignment module 220 may disable hyper-threading on the processor core to which the thread is assigned based on the memory cache requirement.

As used herein, hyper-threading refers to splitting a processor core into a plurality of logical processors (generally, into two logical processors), wherein each logical processor shares the workload of the processor core. When hyper-threading is active, the processor core's memory cache is split between the logical processors. By disabling hyper-threading, the assignment module 220 allows the thread to utilize the entire memory cache at the processor core. The assignment module 220 may assign a thread to a processing core with hyper-threading disabled in response to the thread having a tag indicating that the thread is memory cache intensive.

In some embodiments, the assignment module 220 may assign the thread to a processor core based on one or more system properties of a computer system executing the thread. In another embodiment, the assignment module 220 may allocate computing resources to the thread in response to assigning it to a processor core. In a further embodiment, the assignment module 220 may assign the thread to a processor core based on a cost of locally executing the thread. In certain embodiments, the assignment module 220 may include one or more submodules, such as the properties module 265, the allocation module 270, and/or the cost module 275 for performing the above functions.

The properties module 265, in one embodiment, is configured to identify system properties of a computer system (e.g., the electronic device 105) executing the computing process. In another embodiment, the properties module 265 may be further configured to identify a power state of the computer system executing computing process. As used herein, the power state of the computer system refers to whether the computing system is drawing power from an internal source, such as a battery, or is drawing power from an external power supply, such as an AC adapter. The power state may further refer to a charge level of the battery and/or a power mode of the electronic device 105, such as a power conservation mode that extends battery life by lowering powering consumption of the processor, display, and/or radio transceivers of the electronic device 105.

The system properties of the computer system may include a maximum processor speed, a minimum processor speed, a power consumption at each processor speed, a number of processor cores present, a number of CPUs present, an amount of cache memory in each CPU/processor core, and the like.

In some embodiments, the properties module 265 and/or the requirement module 215 may indicate the system properties to the assignment module 220, wherein the assignment module 220 assigns the thread to a processor core based on the system properties. For example, the properties module 265 may indicate the power state to the assignment module 220, wherein the assignment module 220 assigns the thread to a processor core based further on the power state. More specifically, the assignment module 220 may assign the thread to a processor core with a lower processor speed in response to the power state being on battery power and may assign the thread to a processor core with a higher processor speed in response to the power state being on external power (e.g., plugged into an AC adapter or non-portable power source).

The allocation module 270, in one embodiment, is configured to allocate hardware resources to a thread based on an intra-process priority of the thread. The hardware resources may be allocated from a set of hardware resources assigned to the computing process, for example by a CPU scheduler. In some embodiments, the allocation module 270 functions as a sub-scheduler that schedules the set of hardware resources to the threads of the computing process. For example, the allocation module 275 may allocate a subset of the set of hardware resource to a particular thread based on its intra-process priority. As another example, the allocation module 275 may allocate a subset of the set of hardware resources to the particular thread based on its computational requirements, is QoS level, The cost module 275, in one embodiment, is configured to determine a cost of executing the thread and/or computing process locally. In certain embodiments, the cost module 275 may measure the cost in CPU resources (e.g., cycles), memory resources, power consumption, time-to-complete, and the like. In another embodiment, the cost module 275 may be further configured to determine a cost of transferring the computing process (or the thread) to a remote computing device 130. In certain embodiments, the cost module 275 may measure the cost in CPU resources, memory resources, power consumption, network resources, time-to-complete, and the like.

In some embodiments, the cost module 275 may indicate the calculated cost(s) to the assignment module 220, wherein the assignment module 220 may assign the thread to a processor core based on the calculated cost(s). In a further embodiment, the assignment module 220 may determine whether to offload the computing process or thread to a remote computing device 130 based on the costs calculated by the cost module 275.

Figures 3A, 3B:
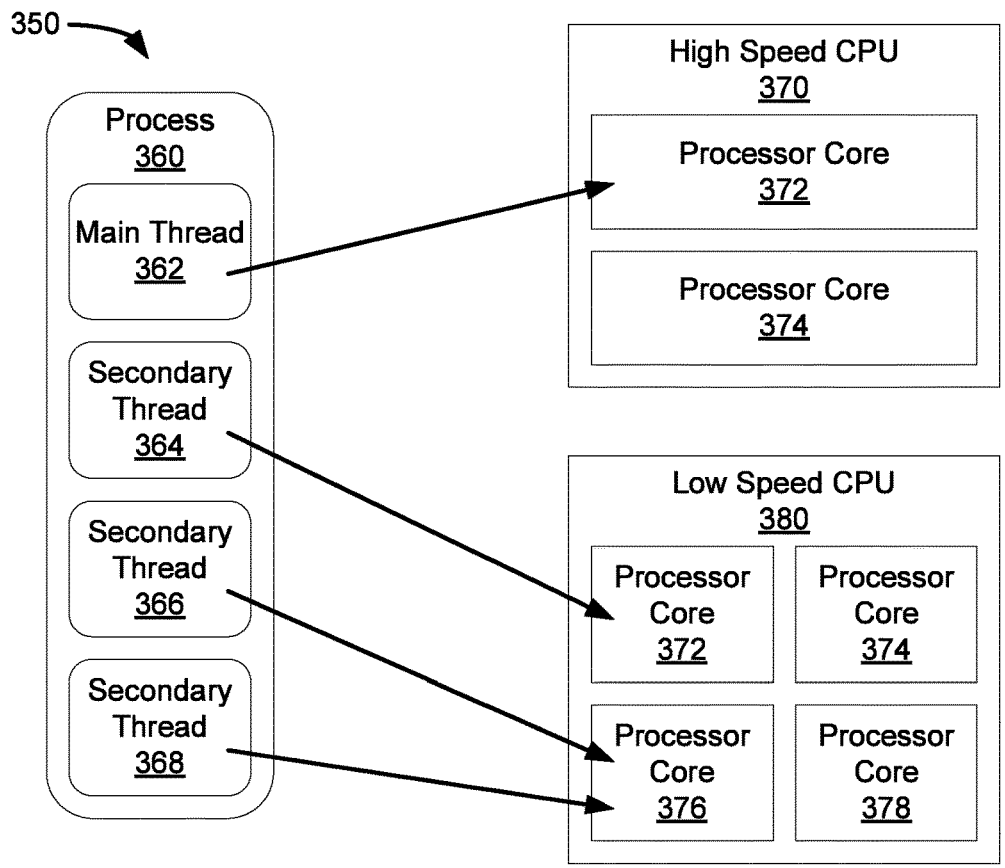
FIG. 3A is a schematic block diagram illustrating one embodiment of a collection of tags for providing granular QoS for computing resources in a computing system.
FIG. 3B is a schematic block diagram illustrating one embodiment of a computing system providing granular QoS for computing resources in a computing system.

FIG. 3A is a schematic block diagram illustrating one embodiment of a collection 300 of tags for providing granular QoS for computing resources in a computing system. The collection 300 of tags may be associated with a thread of a computing process. In some embodiments, the collection 300 of tags may include one or more thread-level tags associated with the thread. In further embodiments, the collection 300 of tags may include one or more process-level tags associated with the computing process (and thus also associated with the thread). In some embodiments, the collection 300 of tags may be identified by the tag module 210. Additionally, the requirement module 215 may determine one or more computational requirements of the thread based on the collection 300 of tags.

As depicted, the collection 300 of tags includes a CPU intensive tag 305, a cache intensive tag 310, a time-sensitive tag 315, a main worker thread tag 320, and a priority tag 325. In some embodiments, the collection 300 of tags may include each of the illustrated tags 305-325. In other embodiments, the collection 300 tags may include one or more of the illustrated tags 305-325. In one embodiment, a programmer or other author of the thread may provide the tags 305-325. In another embodiment, the tag 305-325 may be automatically associated with the thread, e.g., by the tag module 210 and/or the association module 245.

The CPU intensive tag 305, in one embodiment, indicates a computational intensity of the thread. In some embodiments, the CPU intensive tag 305 may have a binary value, indicating that the thread either is computationally intensive or is not computationally intensive. In other embodiments, the CPU intensive tag 305 may have one of a range of values, each value in the range of values indicating a decree of computational intensity of the thread. In one embodiment, the profile module 240 may identify a computational intensity value (e.g., a degree) of the thread and the association module 245 may associate a CPU intensive tag 305 having the corresponding computational intensity value with the thread.

The cache intensive tag 310, in one embodiment, indicates whether the thread is memory cache intensive. For example, a thread may be memory cache intensive based on a number of cache requests. As another example, a thread may be memory cache intensive based on a rate of cache requests. In some embodiments, cache intensive tag 310 may have a binary value, indicating that the thread either is computationally intensive or is not computationally intensive. In other embodiments, the cache intensive tag 310 may have one of a range of values, each value in the range of values indicating a degree of memory cache intensity of the thread. In one embodiment, the profile module 240 may identify a memory cache intensity value (e.g., a degree) of the thread and the association module 245 may associate a cache intensive tag 310 having the corresponding memory cache intensity value with the thread.

The time-sensitive tag 315, in one embodiment, indicates a computational intensity of the thread. For example, a thread may be time sensitive if it is expected to complete within a certain amount of time. As another example, a thread may be time sensitive if it is performing tasks in real-time or near real-time. In some embodiments, the time-sensitive tag 315 may have a binary value, indicating that the thread either is time-sensitive or is not time-sensitive. In other embodiments, the time-sensitive tag 315 may have one of a range of values, each value in the range of values indicating a decree of time-sensitivity of the thread. In one embodiment, the profile module 240 may identify a computational intensity value (e.g., a degree) of the thread and the association module 245 may associate a time-sensitive tag 315 having the corresponding time-sensitivity value with the thread.

The main worker thread tag 320, in one embodiment, indicates whether the thread is memory cache intensive. In some embodiments, main worker thread tag 320 may have a binary value, indicating that the thread either is computationally intensive or is not computationally intensive. In one embodiment, the thread module 205 may identify whether the thread is a main worker thread and the association module 245 may associate a main worker thread tag 320 having the corresponding binary value with the thread.

The priority tag 325, in one embodiment, indicates an intra-process priority of the thread. For example, the intra-process priority of the thread may indicate a relative importance of the thread to the process (e.g., main worker thread or secondary worker thread). As another example, the intra-process priority of the thread may be based on thread dependencies within the computing process. In some embodiments, priority tag 325 may have a binary value, indicating whether or not the thread is important and should be prioritized over non-important threads within the same computing process. In other embodiments, the priority tag 325 may have one of a range of values, each value in the range of values indicating a priority level of the thread. In one embodiment, the profile module 240 may identify a priority level of the thread and the association module 245 may associate a priority tag 325 having the corresponding priority level with the thread.

The depicted embodiment shows a specific number of tags, however, the collection 300 of tags is not limited to the depicted number of tags. In some embodiments, the collection 300 of tags may include a single tag. In other embodiments, the collection 300 of tags may include a dozen tags or more. In yet another embodiment, the collection 300 of tags may be empty, wherein the tag module 210 and/or the association module 245 may associate one or more tags with the thread (e.g., based on a comparison to a thread profile and/or based on a runtime analysis of the process), thereby populating the collection 300 of tags.

FIG. 3B is a schematic block diagram illustrating one embodiment of a computing system 350 providing granular QoS for computing resources in a computing system. In one embodiment, the computing system 350 as an electronic device 105. The computing system 350 includes a computing process 360 to be executed, a high-speed CPU 370, and a low-speed CPU 380. In one embodiment, the high-speed CPU 370 includes two processor cores 372-374. In one embodiment, the low-speed CPU 380 includes four processor cores 382-388.

The computing process 360 includes a main worker thread 362 and three secondary threads 364-368. In one embodiment, the main worker thread 362 is a user interface thread, wherein a user interacts with the computing process 360 via the main worker thread 362. In another embodiment, the main worker thread 362 calls on the secondary worker threads 364-368 to execute various tasks. In a further embodiment, a secondary worker thread, such as the secondary worker threads 364, may be dependent on another secondary worker thread, such as the secondary worker thread 366 and/or the secondary worker thread 368, to complete its task. For example, the secondary worker thread 364 may perform a task, wherein the secondary worker thread 364 relies on the secondary worker thread 366 to retrieve data necessary for completing the task (e.g., from local memory, from remote memory, from sensors, or the like).

In one embodiment, the computing system 350 identifies the main worker thread 362 and assigns the main worker thread 362 the high-speed CPU 370. The computing system 350 may assign the main worker thread 362 to the high-speed CPU 370 due to the main worker thread 362 being computationally intensive, having a high priority, and/or being time sensitive. For example, one or more tags associated with the main worker thread 362 may indicate a computational requirement (e.g., a computational intensity and/or a time-sensitivity) and/or indicate a priority of the main worker thread 362. Based on the computational requirements and/or on the priority of the main worker thread 362, the computing system 350 assigns the main worker thread 362 to the processor core 372 of the high-speed CPU 370. In a further embodiment, the computing system 350 may assign the main worker thread 362 to a dedicated processor core 372. As depicted, no other threads of the computing process 360 are assigned to the processor core 372.

In one embodiment, the computing system 350 identifies a secondary worker thread 364 and assigns the secondary worker thread 364 to the low-speed CPU 380. The computing system 350 may assign the secondary worker thread 364 to the processor core 382 of the low-speed CPU 380 due to the secondary worker thread 364 not being computationally intensive, not having a high priority, and/or not being time sensitive. For example, one or more tags associated with the secondary worker thread 364 may indicate a computational requirement (e.g., a computational intensity and/or a time-sensitivity) and/or indicate a priority of the secondary worker thread 364. Based on the computational requirements and/or on the priority of the secondary worker thread 364, the computing system 350 assigns the secondary worker thread 364 to the processor core 382 of the low-speed CPU 380.

While the depicted embodiment shows no other threads of the computer process 360 being assigned to the processor core 382, in other embodiments other threads (either from the same computing process 360 or from other computing processes executing on the computing system 350) may be assigned to the processor core 382.

In one embodiment, the computing system 350 identifies a secondary worker thread 366 and assigns a secondary worker thread 366 to the low-speed CPU 380. Further, the computing system 350 may assign the secondary worker thread 366 to the processor core 386 of the low-speed CPU 380. The computing system 350 may assign the secondary worker thread 366 to the processor core 386 of the low-speed CPU 380 due to the secondary worker threads 366 not being computationally intensive, not having a high priority, and/or not being time sensitive. For example, one or more tags associated with the secondary worker thread 366 may indicate a computational requirement (e.g., a computational intensity and/or a time-sensitivity) and/or indicate a priority of the secondary worker thread 366. Based on the computational requirements and/or on the priority of the secondary worker thread 366, the computing system 350 assigns the secondary worker thread 366 to the processor core 386 of the low-speed CPU 380.

In another embodiment, the computing system 350 may also assign the secondary worker thread 368 to the processor core 386 of the low-speed CPU 380. The computing system 350 may assign the secondary worker thread 368 to the processor core 386 of the low-speed CPU 380 based on one or more tags indicating that the secondary worker thread 368 is not computationally intensive, does not have a high priority, and/or is not time sensitive. In one embodiment, the computing system 350 assigns the secondary worker threads 366-368 to the same processor core (e.g., the processor core 386) in order to save power at the processor cores 384 and 388 by shutting down (e.g., transitioning to a low-power state) the idle processor cores 384 and 388. In a further embodiment, computing system 350 may transition the idle processor core 374 to a low-power state, thereby saving power.

Figure 4:
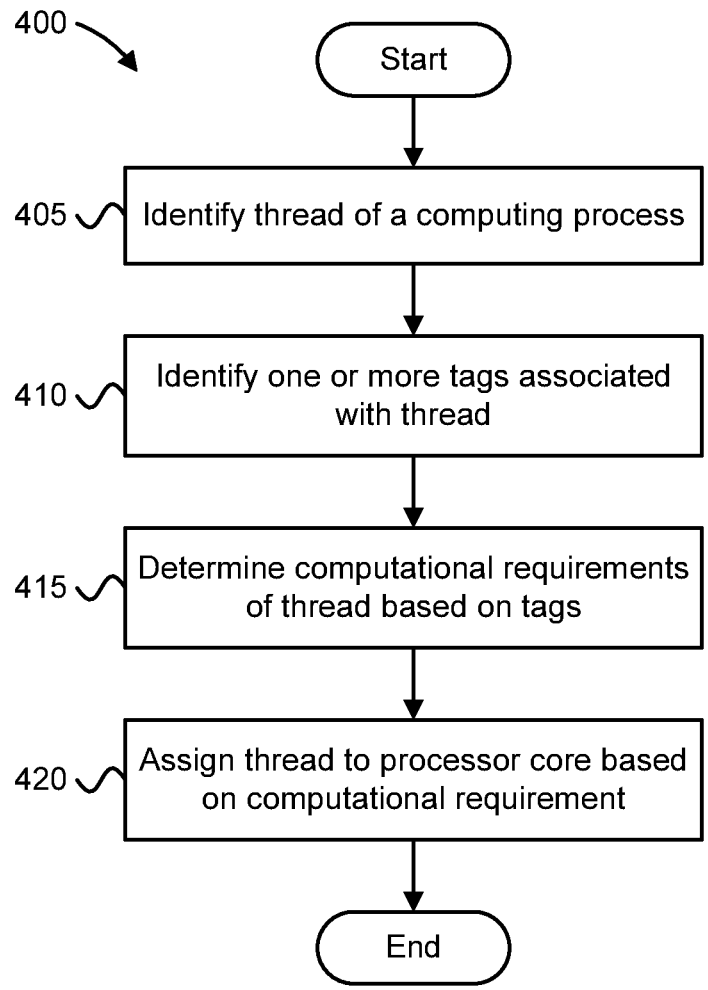
FIG. 4 is a flow chart diagram illustrating one embodiment of a method for providing granular QoS for computing resources in a computing system.

FIG. 4 is a flow chart diagram illustrating one embodiment of a method 400 for providing granular QoS for computing resources in a computing system. In one embodiment, the method 400 is performed by the electronic device 105. In another embodiment, the method 400 may be performed by the granular QoS apparatus 200. Alternatively, the method 400 may be performed by a computer readable storage medium, such as the memory 115. The computer readable storage medium may store code that is executed on the processor 110 to perform the functions of the method 400.

The method 400 begins and identifies 405 at least one thread of a computing process. In one embodiment, the thread module 205 identifies 405 at least one thread of a computing process. In some embodiments, identifying 405 at least one thread of a computing process includes identifying a plurality of threads and determining a main worker thread of the computing process from among the plurality of threads. In other embodiments, identifying 405 at least one thread of computing process includes identifying thread dependencies among a plurality of threads belonging to the computing process.

The method 400 identifies 410 one or more tags associated with the thread. In one embodiment, the tag module 210 identifies 410 one or more tags associated with the thread. In some embodiments, identifying 410 one or more tags associated with thread includes identifying at least one thread-level tag associated with thread. In other embodiments, identifying 410 one more tags associated with the thread includes identifying a thread unassociated with any tags (e.g., identifying and untagged thread).

The method 400 determines 415 a computational requirement of the thread based on the tags. In one embodiment, the requirement module 215 determines 415 a computational requirement of the thread based on the tags. In some embodiments, determining 415 the computational requirement based on the one or more tags includes determining a speed requirement and/or a time-sensitivity level of the thread based on the one or more tags. In certain embodiments, determining 415 the computational requirement based on the one or more tags includes identifying a memory cache requirement of the thread.

The method 400 assigns 420 the thread to a processor core based on the computational requirements. The method 400 ends. In one embodiment, the assignment module 220 assigns 420 the thread to a processor core based on the computational requirements. In certain embodiments, assigning 420 the thread to a processor core includes assigning the main worker thread to a processor core reserved for the main worker thread. In some embodiments, assigning 420 the thread to a processor core includes assigning the thread further based on a power state of a computing device executing the thread.

Figure 5:
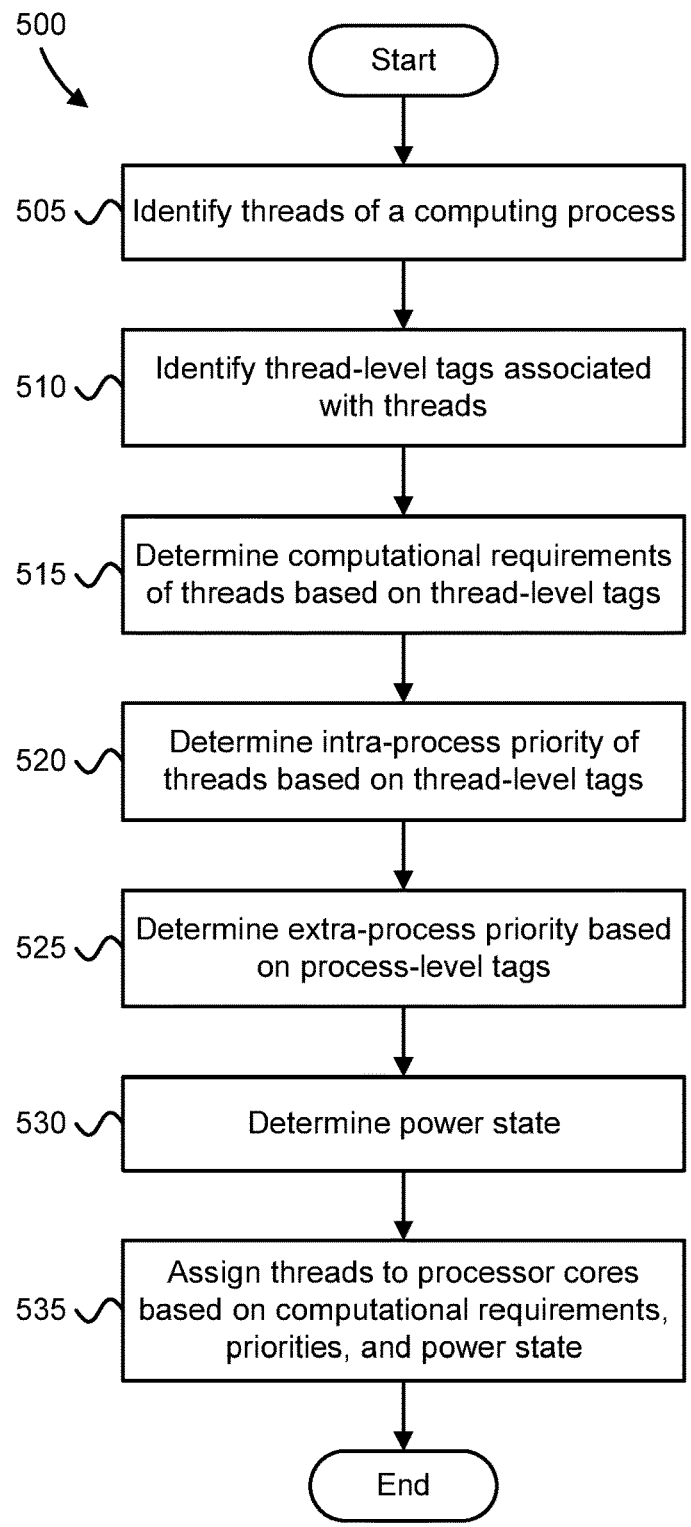
FIG. 5 is a flow chart diagram illustrating another embodiment of a method providing granular QoS for computing resources in a computing system.

FIG. 5 is a schematic flow chart diagram illustrating one embodiment of a method 500 for providing granular QoS for computing resources in a computing system. In one embodiment, the method 500 is performed by the electronic device 105. In another embodiment, the method 500 may be performed by the granular QoS apparatus 200. Alternatively, the method 500 may be performed by a computer readable storage medium, such as the memory 115. The computer readable storage medium may store code that is executed on the processor 110 to perform the functions of the method 500.

The method 500 begins and identifies 505 at least one thread of a computing process. In one embodiment, the thread module 205 identifies 505 at least one thread of a computing process. In some embodiments, identifying 505 at least one thread of a computing process includes identifying a plurality of threads and determining a main worker thread of the computing process from among the plurality of threads. In other embodiments, identifying 505 at least one thread of computing process includes identifying thread dependencies among a plurality of threads belonging to the computing process.

The method 500 identifies 510 one or more thread-level tags associated with the thread. In one embodiment, the tag module 210 identifies 510 one or more thread-level tags associated with the thread. The method 500 determines 515 a computational requirement of each thread based on the thread-level tags. In one embodiment, the requirement module 215 determines 515 the computational requirement of each thread based on the thread-level tags.

The method 500 determines 520 an intra-process priority for each thread based on the thread-level tags. In one embodiment, the priority module 230 determines 520 an intra-process priority for each thread based on the thread-level tags. In some embodiments, determining 520 the intra-process priority includes determining an intra-process priority based on thread dependencies.

The method 500 determines 525 an extra-process priority for the computing process based on process-level tags. In one embodiment, the priority module 230 determines 525 an extra-process priority for the computing process based on process-level tags. In some embodiments, determining 525 the extra-process priority comprises the priority module 230 comparing process-level tags of a first computing process to process-level tags of a second computing process to determine an extra-process priority between the first computing process and the second computing process.

The method 500 determines 530 a power state, for example the power state of the electronic device 105. In one embodiment, the properties module 265 determines 530 the power state. In some embodiments, determining 530 the power state includes determining whether the electronic device 105 is running on battery power.

The method 500 assigns 535 the thread to a processor core based on the computational requirements, the intra- and extra-process priorities, and the power state. The method 500 ends. In one embodiment, the assignment module 220 assigns 535 the thread to a processor core based on the computational requirements, the intra- and extra-process priorities, and the power state.

Figure 6:
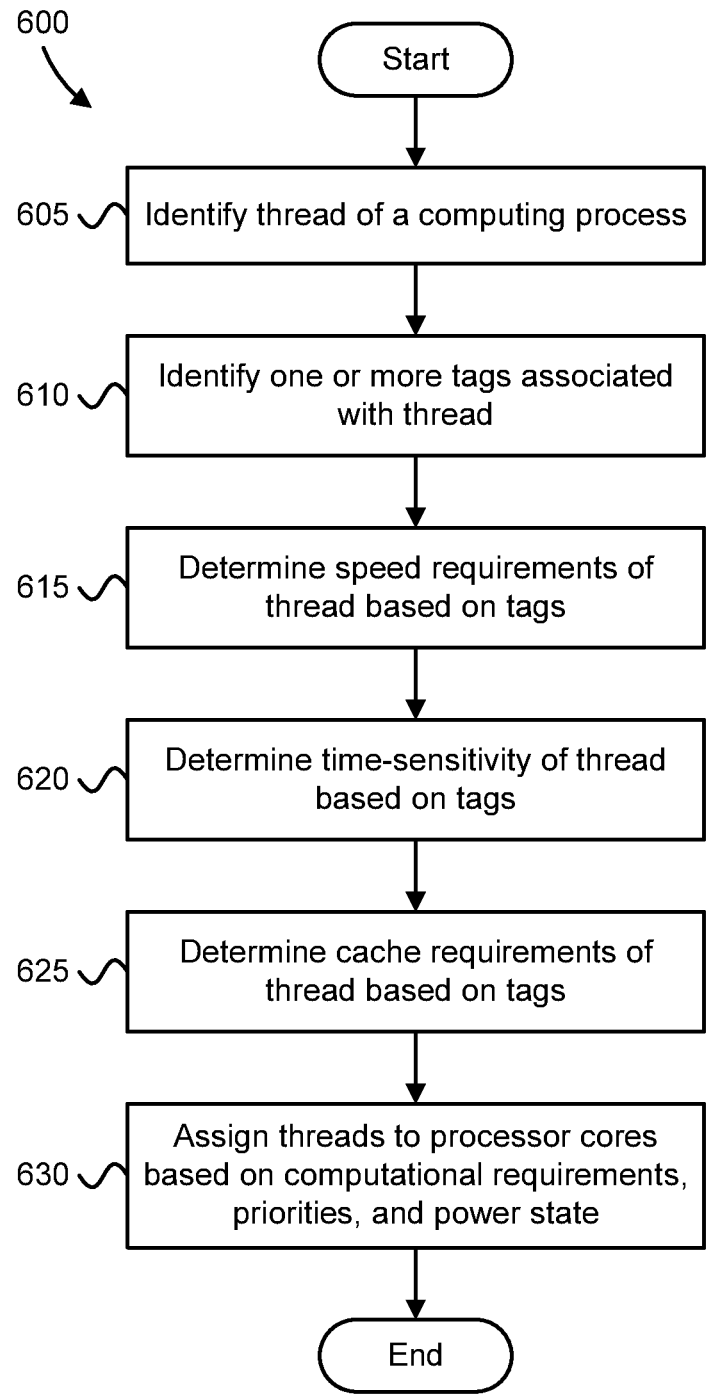
FIG. 6 is a flow chart diagram illustrating yet another embodiment of a method for providing granular QoS for computing resources in a computing system.

FIG. 6 is a schematic flow chart diagram illustrating another embodiment of a method 600 for providing granular QoS for computing resources in a computing system. In one embodiment, the method 600 is performed by the electronic device 105. In another embodiment, the method 600 may be performed by the granular QoS apparatus 200. Alternatively, the method 600 may be performed by a computer readable storage medium, such as the memory 115. The computer readable storage medium may store code that is executed on the processor 110 to perform the functions of the method 600.

The method 600 begins and identifies 605 at least one thread of a computing process. In one embodiment, the x205 identifies 605 at least one thread of a computing process. The method 600 identifies 610 one or more tags associated with the thread. In one embodiment, the x210 identifies 610 one or more tags associated with the thread. In certain embodiments, the one or more tags describe characteristics of the thread, such as priority, time-sensitivity, computational intensity, or the like.

The method 600 determines 615 a speed requirement of the thread, based on the tags. In one embodiment, the x250 determines 615 a speed requirement of the thread, based on the tags. In some embodiments, determining 615 the speed requirement includes identifying an estimated length and/or estimated completion time of the thread.

The method 600 determines 620 a time-sensitivity level of the thread, based on the tags. In one embodiment, the x255 determines 620 a time-sensitivity level of the thread, based on the tags. In some embodiments, determining 620 the time-sensitivity level includes determining whether the thread is tagged as being delay tolerant.

The method 600 determines 625 cache requirements of the thread based on the tags. In one embodiment, the x260 determines 625 cache requirements of the thread based on the tags. In some embodiments, determining 625 the cache requirements include determining whether the thread is tagged as being memory cache intensive.

The method 600 assigns 630 the thread to a processor core based on the speed requirements, time-sensitivity level, and cache requirements. The method 600 ends. In one embodiment, the x220 assigns 630 the thread to a processor core based on the speed requirements, time-sensitivity level, and cache requirements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor comprising a plurality of processor cores, wherein the plurality of processor cores comprises a first set of processor cores operating at a first processor speed and a second set of processor cores operating at a second processor speed, the second processor speed being less than the first processor speed; and a memory that stores code executable by the processor to:

identify a computing process scheduled to run on the plurality of processor cores, the identified computing process selected from a plurality of processes;

allocate a set of hardware resources to the identified computing process based on an extra-process priority of the identified computing process among the plurality of processes;

identify a plurality of threads belonging to the identified computing process, wherein the plurality of threads belonging to the computing process comprises a main worker thread of the computing process and a plurality of secondary threads of the same process;

identify one or more thread-level tags associated with each thread of the identified computing process;

identify a power state of the apparatus;

determine a computational requirement of each thread based on the one or more thread-level tags, the computational requirement comprising a cost of locally executing the thread;

allocate resources from the set of hardware resources to each thread based on the computational requirement of each thread, wherein allocating resources from the set of hardware resources comprises assigning, prior to executing the identified computing process, the main thread to a first core of the plurality of processor cores based on the computational requirement, wherein the first core is reserved for the main thread with no other thread being assigned to the first core; and wherein allocating resources from the set of hardware resources comprises assigning, prior to executing the identified computing process, the plurality of secondary threads to different ones of the plurality of processor cores based on the computational requirement of each thread, wherein assigning the plurality of secondary threads to different ones of the plurality of processor cores based on the computational requirement of each thread comprises assigning a secondary thread to a processor core of the second set of processor cores in response to the power state being on battery power.

2. The apparatus of claim 1, wherein the processor further:

determines an intra-process priority of each thread of the plurality of threads based on the one or more thread-level tags; and wherein allocating resources from the set hardware resources to each thread is further based on the intra-process priority, wherein the hardware resources are allocated from the set of hardware resources assigned to the computing process.

3. The apparatus of claim 2, wherein the processor further identifies thread dependencies among a plurality of threads belonging to the computing process, wherein determining the intra-process priority of the thread comprises assigning the intra-process priority based on the thread dependencies.

4. The apparatus of claim 2, wherein the processor further determines the extra-process priority of the computing process based on one or more process-level tags.

5. The apparatus of claim 1, wherein the processor further:

determines a speed requirement of each thread based on the one or more thread-level tags; and determines a thread completion time for each thread based on the second processor speed, wherein assigning the main thread to the first core of the processor cores based on the computational requirement includes assigning the thread to a processor core of the second set of processor cores in response to the thread completion time being less than the speed requirement.

6. The apparatus of claim 1, wherein assigning the main thread to the first core of the processor cores is further based on the power state.

7. The apparatus of claim 6, wherein assigning the main thread to the first core of the processor cores based on the power state comprises assigning the main thread to a processor core of the second set of processor cores in response to the power state being on battery power and assigning the main thread to a processor core of the first set of processor cores in response to the power state being on external power.

8. The apparatus of claim 1, wherein the processor further:

determines a time requirement of the computing process based on one or more process-level tags; and offloads at least one thread the computing process to a remote computing device based on the time requirement and the cost of executing the computing process locally.

9. The apparatus of claim 1, wherein the plurality of processor cores comprises at least one processor core with a larger memory cache than others of the plurality of processor cores, wherein determining the computational requirement of the thread based on the one or more tags comprises identifying a memory cache requirement of the thread, wherein assigning the main thread to a first processor core selecting a processor core based on the memory cache requirement, and wherein assigning the plurality of secondary threads to different ones of the plurality of processor cores comprises selecting a processor core based on the memory cache requirement of the secondary threads.

10. A method comprising:

identifying a computing process scheduled to run on the plurality of processor cores, the identified computing process selected from a plurality of processes;

identifying, by use of a processor, a plurality of threads belonging to the identified computing process, wherein the plurality of threads belonging to the computing process comprises a main worker thread of the computing process and a plurality of secondary threads of the same process;

identifying one or more tags associated with each thread;

identifying a power state of the apparatus;

determining a computational requirement of each thread based on the one or more tags, the computational requirement comprising a cost of locally executing the thread;

allocating resources from the set of hardware resources to each thread based on the computational requirement of each thread, wherein allocating resources from the set of hardware resources comprises assigning, prior to executing the identified computing process, the main thread to a first core of a plurality of processor cores based on the computational requirement, wherein the first core is reserved for the main thread with no other thread being assigned to the first core, wherein the plurality of processor cores comprises a first set of processor cores operating at a first processor speed and a second set of processor cores operating at a second processor speed, the second processor speed being less than the first processor speed; and offloading at least one secondary thread to a remote computing device in response to the power state being on battery power; and assigning, prior to executing the identified computing process, a remainder of the plurality of secondary threads to different ones of the plurality of processor cores based on the computational requirement of each thread, wherein assigning the remainder of the plurality of secondary threads to different ones of the plurality of processor cores based on the computational requirement of each thread comprises assigning a secondary thread to a processor core of the second set of processor cores in response to the power state being on battery power.

11. The method of claim 10, further comprising identifying system properties of a computer system executing the computing process and selecting the first core based on the system properties.

12. The method of claim 10, further comprising:
determining an intra-process priority for each thread based on the one or more tags;
identifying a set of hardware resources assigned to the computing process; and
allocating hardware resources, from the set of hardware resources, to each thread based on the intra-process priority.

13. The method of claim 10, wherein determining a computational requirement of the thread based on the one or more tags comprises determining a time-sensitivity level of the thread based on the one or more tags, wherein the method further includes assigning an intra-process priority to the thread based on the time-sensitivity level.

14. The method of claim 10, wherein determining a computational requirement of the thread based on the one or more tags comprises identifying a memory cache requirement of the thread, wherein assigning the thread to one of the processor cores based on the computational requirement comprises selecting a processor core based on the memory cache requirement.

15. The method of claim 14, further comprises disabling hyper-threading on a processor core based on the memory cache requirement of a thread assigned to that processor core.

16. The method of claim 10, wherein determining a computational requirement of the thread based on the one or more tags comprises identifying a speed requirement of the thread, wherein assigning the main thread to the first core based on the computational requirement comprises selecting a processor core based on the speed requirement.

17. A program product comprising a computer readable storage medium that is not a transitory signal and that stores code executable by a processor, the executable code comprising code to:
identify a computing process scheduled to run on the plurality of processor cores, the identified computing process selected from a plurality of processes;
allocate a set of hardware resources to the identified computing process based on an extra-process priority of the identified computing process among the plurality of processes;
identify a plurality of threads belonging to the identified computing process, wherein the plurality of threads belonging to the computing process comprises a main worker thread of the computing process and a plurality of secondary threads of the same process;
identify one or more tag associated with each thread of the identified computing process;
determine a power state of the apparatus;
determine a computational requirement of each thread based on the one or more tags, the computational requirement comprising a cost of locally executing the thread;
select a specific one of a plurality of processor cores based on the computational requirement, wherein the plurality of processor cores comprises a first set of processor cores operating at a first processor speed and a second set of processor cores operating at a second processor speed, the second processor speed being less than the first processor speed; and
assign the main thread to the selected processor core prior to executing the identified computing process, wherein the first core is reserved for the main thread with no other thread being assigned to the first core;
offload at least one secondary thread to a remote computing device in response to the power state being on battery power; and
assign, prior to executing the identified computing process, a remainder of the plurality of secondary threads to different ones of the plurality of processor cores based on the computational requirement of each thread,
wherein assigning the remainder of the plurality of secondary threads to different ones of the plurality of processor cores based on the computational requirement of each thread comprises assigning a secondary thread to a processor core of the second set of processor cores in response to the power state being on battery power.

18. The program product of claim 17, the code to further perform: allocating hardware resources to each thread based on the one or more tags, wherein the hardware resources are allocated from the set of resources assigned to the computing process.

19. The program product of claim 17, the code to further perform:
identifying an untagged thread, wherein the untagged thread is not associated with any tags;
comparing the untagged thread to one or more thread profiles; and
associating one or more tags with the untagged thread based on the comparison.

20. The program product of claim 17, wherein the plurality of processor cores comprises at least one processor core with a larger memory cache than others of the plurality of processor cores, wherein determining the computational requirement of the thread based on the one or more tags comprises identifying a memory cache requirement of the thread, wherein assigning the main thread to a first processor core selecting a processor core based on the memory cache requirement, and wherein assigning the plurality of secondary threads to different ones of the plurality of processor cores comprises selecting a processor core based on the memory cache requirement of the secondary threads.

* * * * *